United States Patent
Park

(10) Patent No.: US 11,614,836 B1
(45) Date of Patent: Mar. 28, 2023

(54) APPARATUS FOR SUPPORTING A READING AND METHOD FOR DETECTING A USER INPUT USING THE SAME

(71) Applicant: WOONGJIN THINKBIG CO., LTD., Paju-si (KR)

(72) Inventor: Jeonguk Park, Paju-si (KR)

(73) Assignee: WOONGJIN THINKBIG CO., LTD., Paju-si (KR)

(*) Notice: Subject to any disclaimer, the term of this patent is extended or adjusted under 35 U.S.C. 154(b) by 0 days.

(21) Appl. No.: 17/508,657

(22) Filed: Oct. 22, 2021

(30) Foreign Application Priority Data

Sep. 10, 2021 (KR) .................. 10-2021-0120716

(51) Int. Cl.
| | |
|---|---|
| *G06F 3/042* | (2006.01) |
| *G06F 3/01* | (2006.01) |
| *G06F 3/14* | (2006.01) |
| *G06V 20/00* | (2022.01) |
| *G06V 40/20* | (2022.01) |
| *G06V 40/10* | (2022.01) |
| *H04N 5/272* | (2006.01) |

(52) U.S. Cl.
CPC .............. *G06F 3/0425* (2013.01); *G06F 3/14* (2013.01); *G06V 20/00* (2022.01); *G06V 40/107* (2022.01); *G06V 40/28* (2022.01); *G06V 2201/131* (2022.01); *H04N 5/272* (2013.01)

(58) Field of Classification Search
CPC ...... G06F 3/0425; G06F 3/0426; G06F 3/017; G06F 3/14; G06F 3/0304; G06V 40/28; G06V 40/20; G06V 40/107; G06V 40/113; G06V 20/00
See application file for complete search history.

(56) References Cited

U.S. PATENT DOCUMENTS

| | | | |
|---|---|---|---|
| 7,110,619 B2 * | 9/2006 | Frohlich | H04N 1/19594 382/292 |
| 10,796,187 B1 | 10/2020 | Mei et al. | |
| 2011/0304584 A1 | 12/2011 | Hwang | |
| 2012/0042288 A1 * | 2/2012 | Liao | G06F 3/017 348/207.1 |

(Continued)

FOREIGN PATENT DOCUMENTS

| | | |
|---|---|---|
| JP | 2015-119430 A | 6/2015 |
| JP | 2020-201924 A | 12/2020 |
| KR | 10-2010-0095987 A | 9/2010 |

(Continued)

OTHER PUBLICATIONS

Korean Office Action dated Dec. 15, 2022 as received in application No. 10-2021-0120716.

*Primary Examiner* — Xuemei Zheng
(74) *Attorney, Agent, or Firm* — Maschoff Brennan

(57) ABSTRACT

Disclosed are a reading support apparatus which can detect a user input (touch and/or drag) conducted on a real book by using one camera, and a user input detection method using the same. The reading support apparatus sets a finger and/or nail on a target surface image captured through one camera to touch recognition reference, detects, as a user input, a user's touch or drag conducted on the surface of the real book by comparing the finger and/or nail included in the target surface image to the touch recognition reference, and provides an action corresponding to the user input.

20 Claims, 12 Drawing Sheets

(56) References Cited

U.S. PATENT DOCUMENTS

2012/0260207 A1    10/2012  Treskunov et al.
2014/0079318 A1*    3/2014  Hasegawa ........... G06F 3/04842
                                                            382/165

FOREIGN PATENT DOCUMENTS

| KR | 10-2012-0114139 A | 10/2012 | |
|----|-------------------|---------|---|
| KR | 10-1587471 B1 | 1/2016 | |
| WO | WO-9921122 A1 * | 4/1999 | ............. G06F 3/011 |
| WO | 2013-051681 A | 4/2013 | |

* cited by examiner

[Fig. 1]
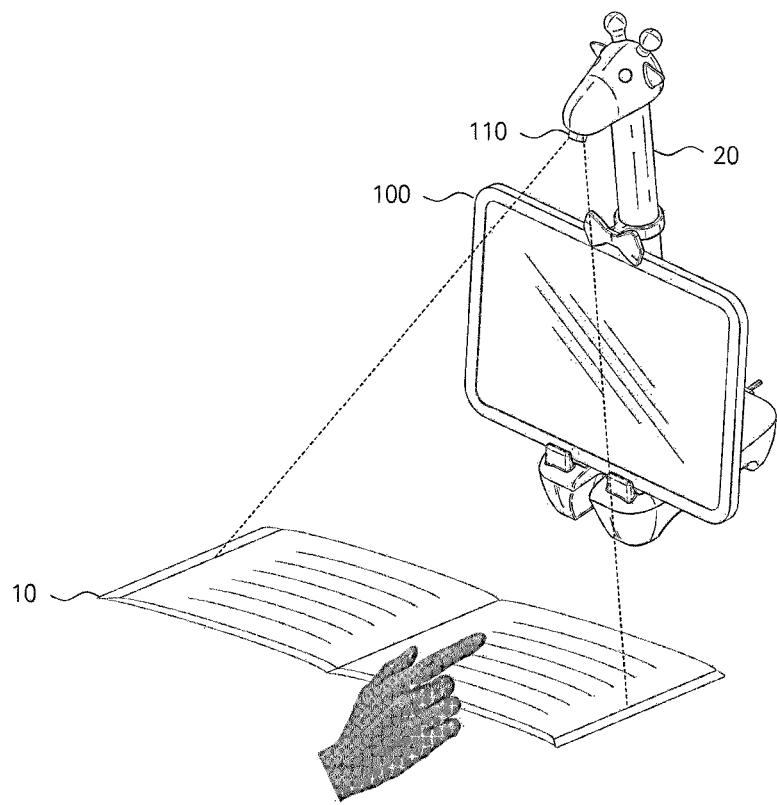

[Fig. 2]
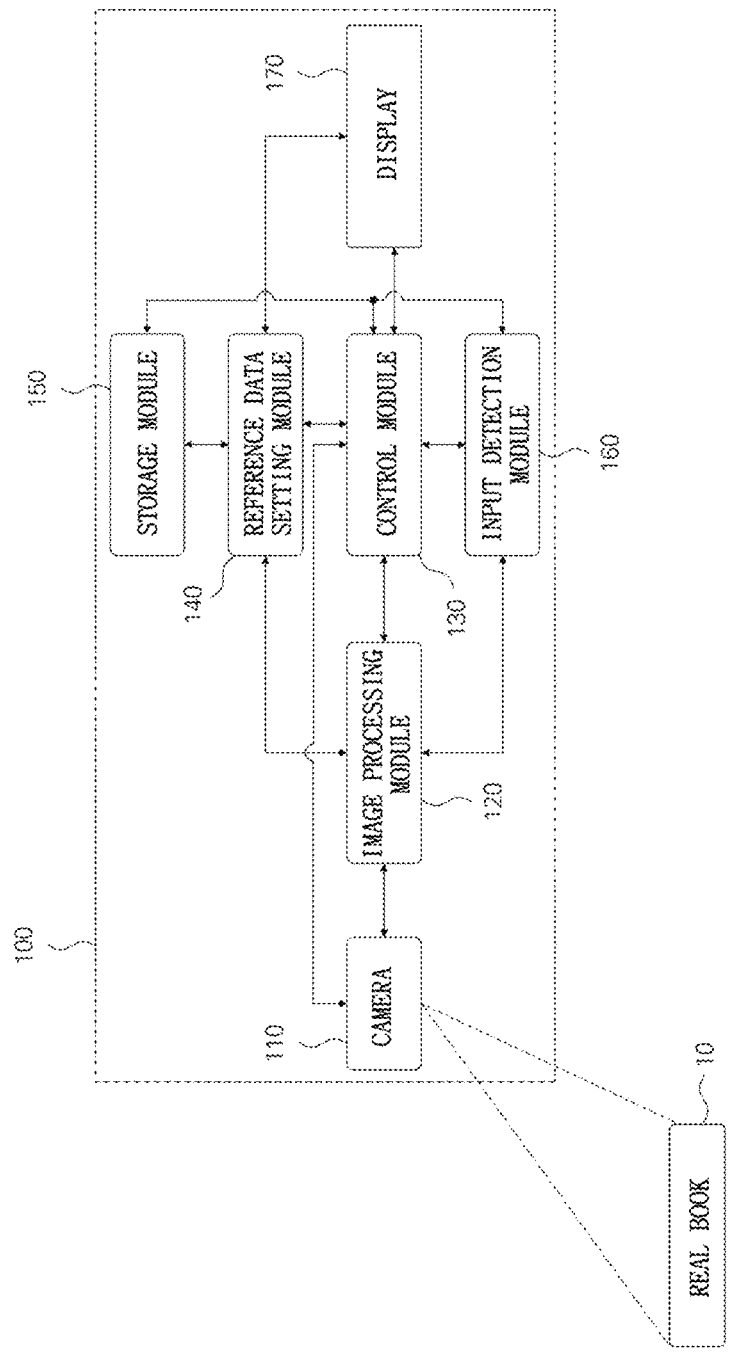

[Fig. 3]
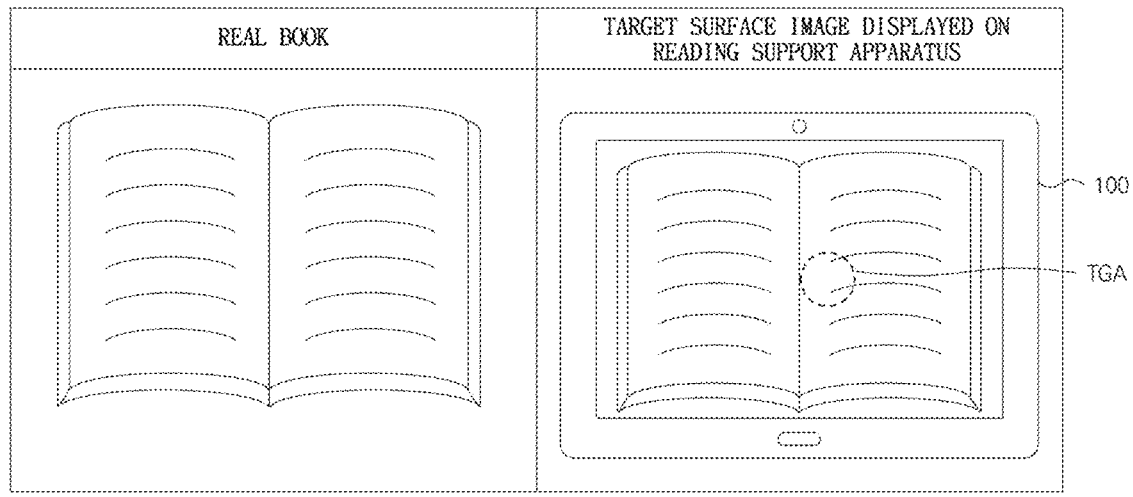
[Fig. 4]
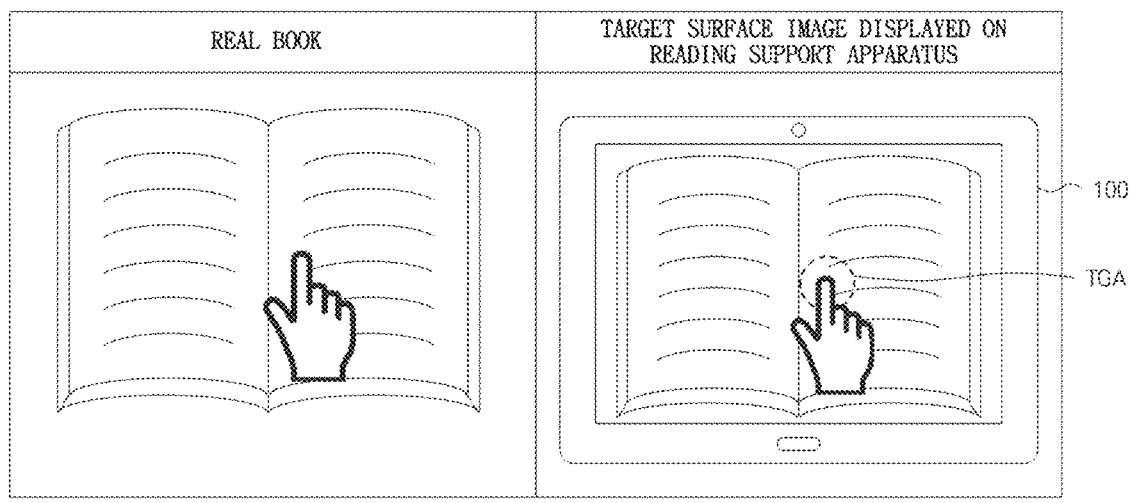

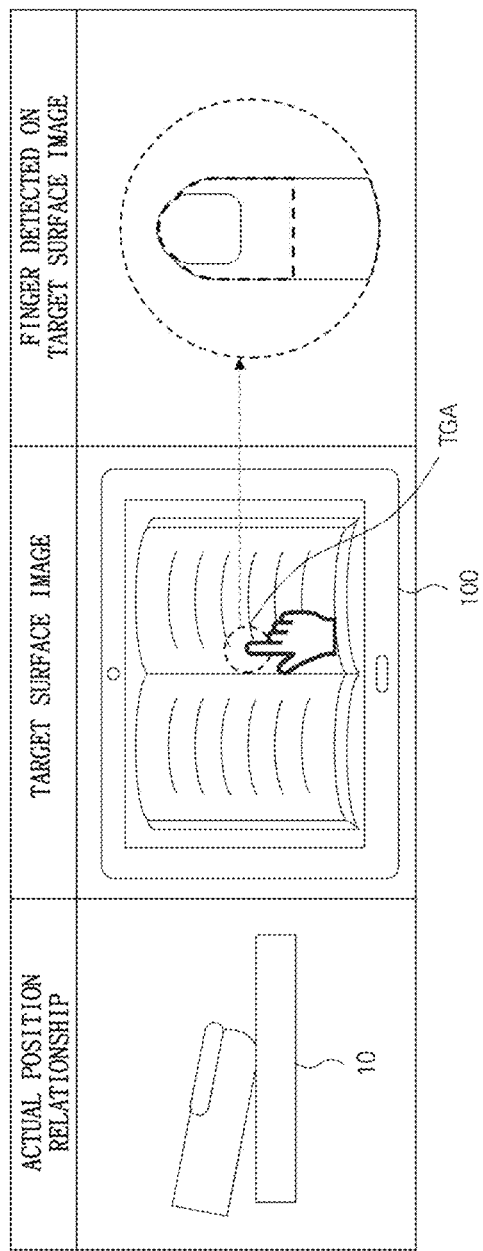
[Fig. 5]

[Fig. 6]
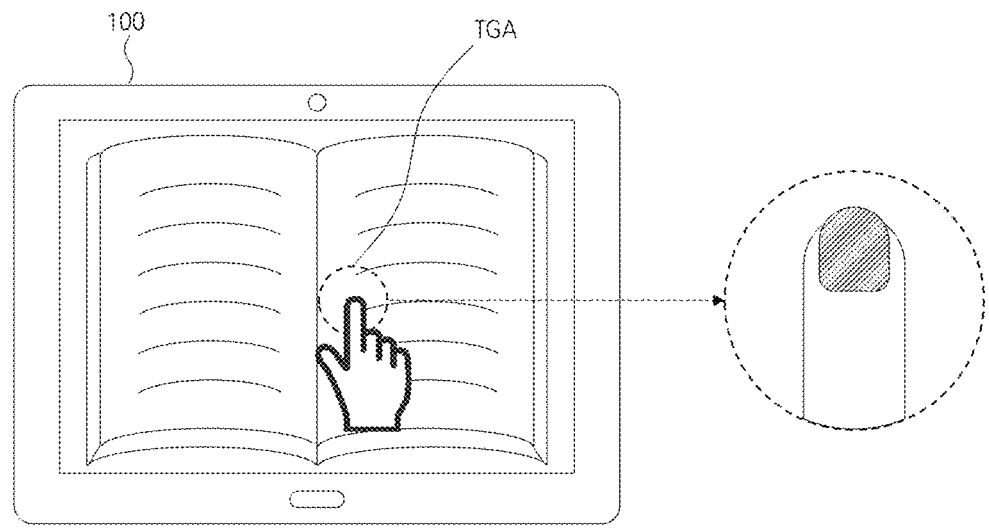
[Fig. 7]
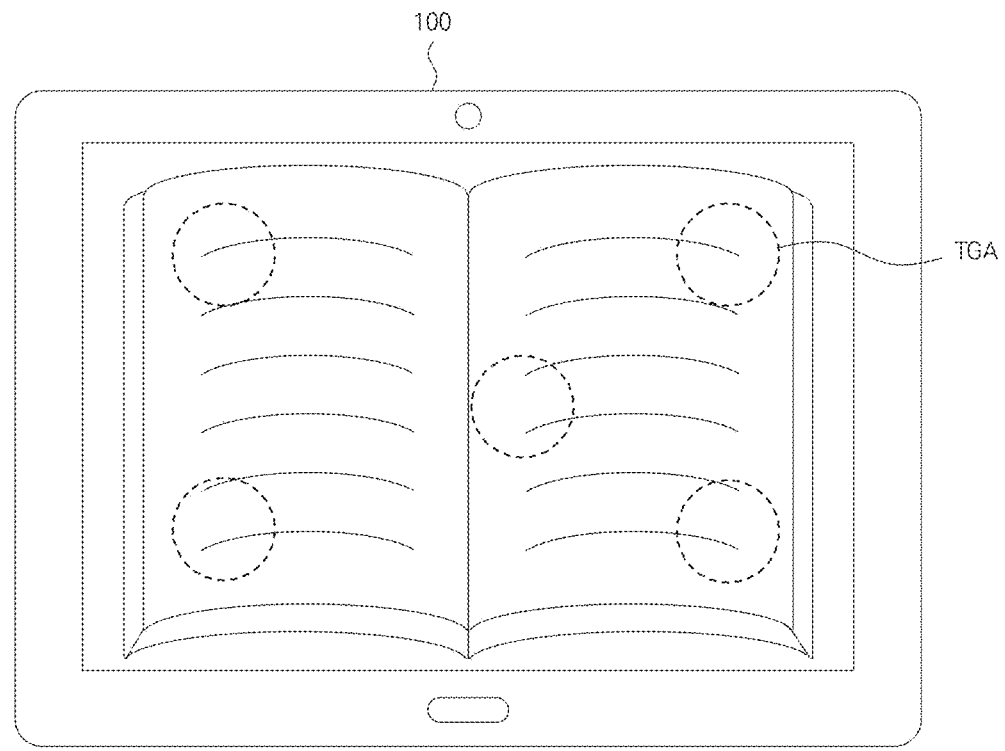

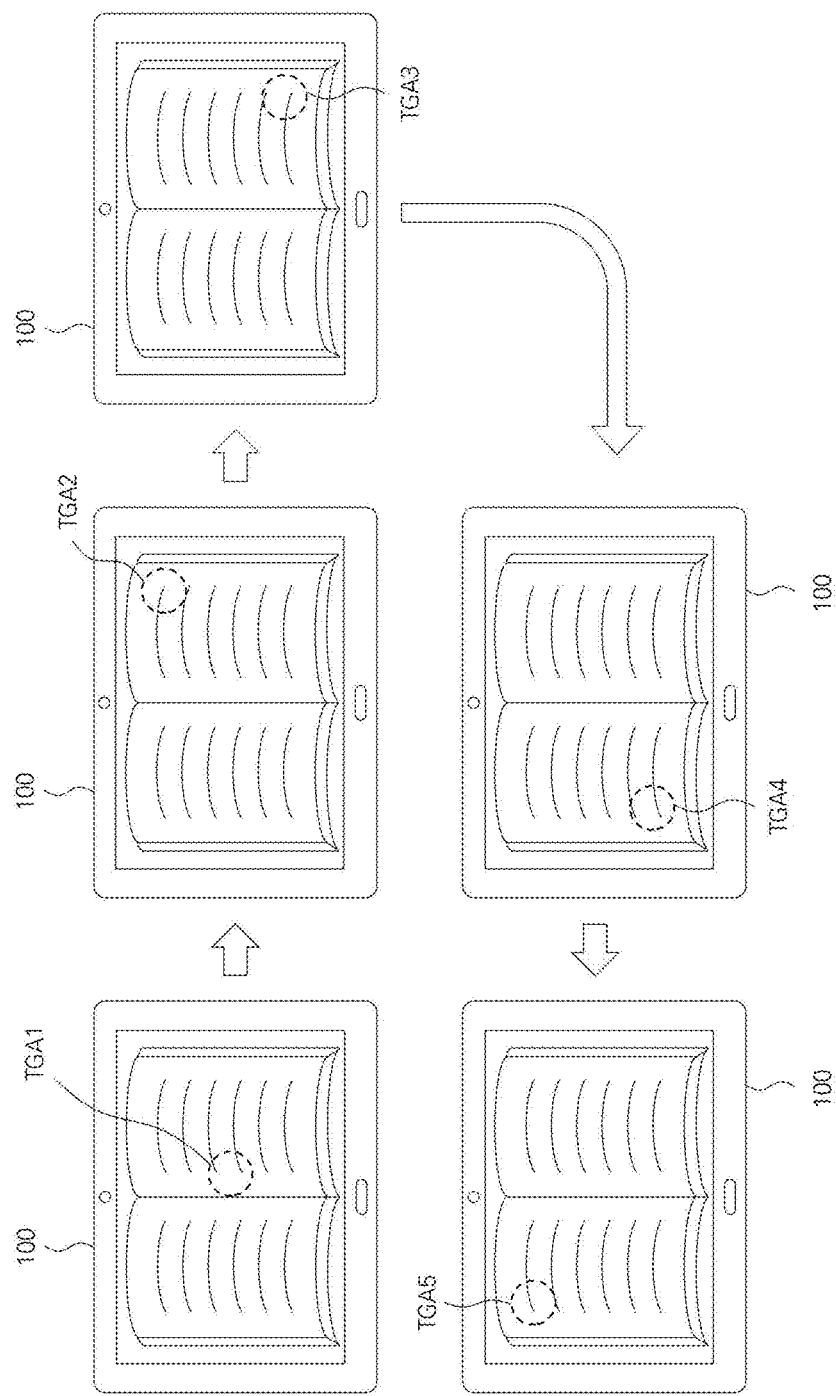

[Fig. 9]

| CLASSIFICATION | LOCATION | SIZE | SHAPE |
|---|---|---|---|
| TOUCH RECOGNITION REFERENCE 1 | GUIDE COORDINATE 1 | V1, H1 | SHAPE 1 |
| TOUCH RECOGNITION REFERENCE 2 | GUIDE COORDINATE 2 | V2, H2 | SHAPE 2 |
| TOUCH RECOGNITION REFERENCE 3 | GUIDE COORDINATE 3 | V3, H3 | SHAPE 3 |
| TOUCH RECOGNITION REFERENCE 4 | GUIDE COORDINATE 4 | V4, H4 | SHAPE 4 |
| TOUCH RECOGNITION REFERENCE 5 | GUIDE COORDINATE 5 | V5, H5 | SHAPE 5 |
| ... | ... | ... | ... |

[Fig. 10]

| CLASSIFICATION | LOCATION | IMAGE |
|---|---|---|
| TOUCH RECOGNITION REFERENCE 1 | GUIDE COORDINATE 1 | FINGER IMAGE 1 |
| TOUCH RECOGNITION REFERENCE 2 | GUIDE COORDINATE 2 | FINGER IMAGE 2 |
| TOUCH RECOGNITION REFERENCE 3 | GUIDE COORDINATE 3 | FINGER IMAGE 3 |
| TOUCH RECOGNITION REFERENCE 4 | GUIDE COORDINATE 4 | FINGER IMAGE 4 |
| TOUCH RECOGNITION REFERENCE 5 | GUIDE COORDINATE 5 | FINGER IMAGE 5 |
| ... | ... | ... |

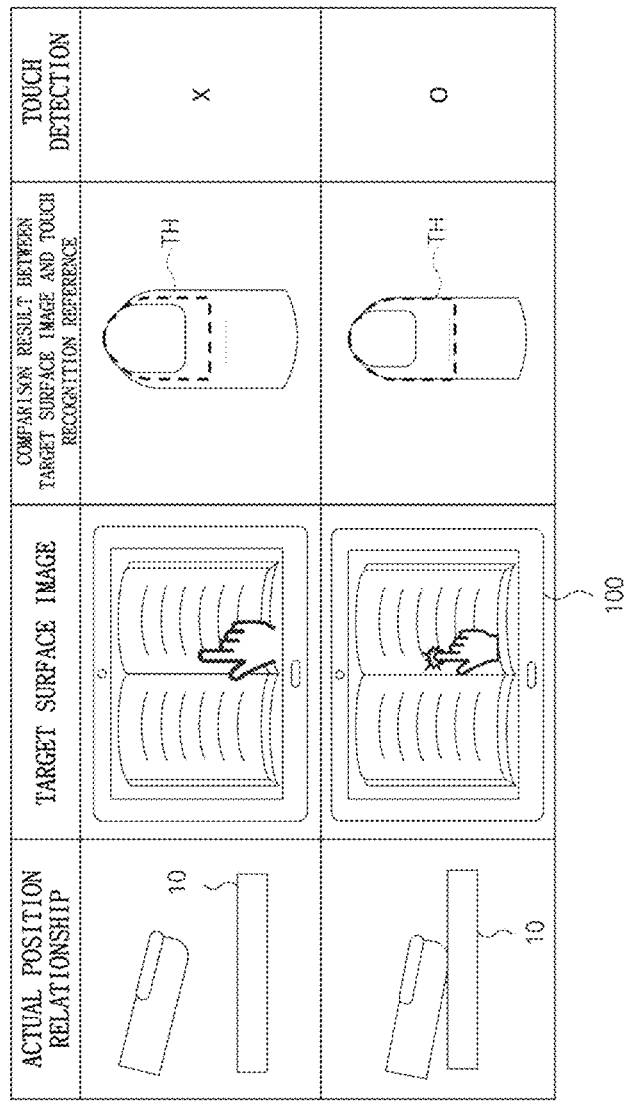

[Fig. 12]
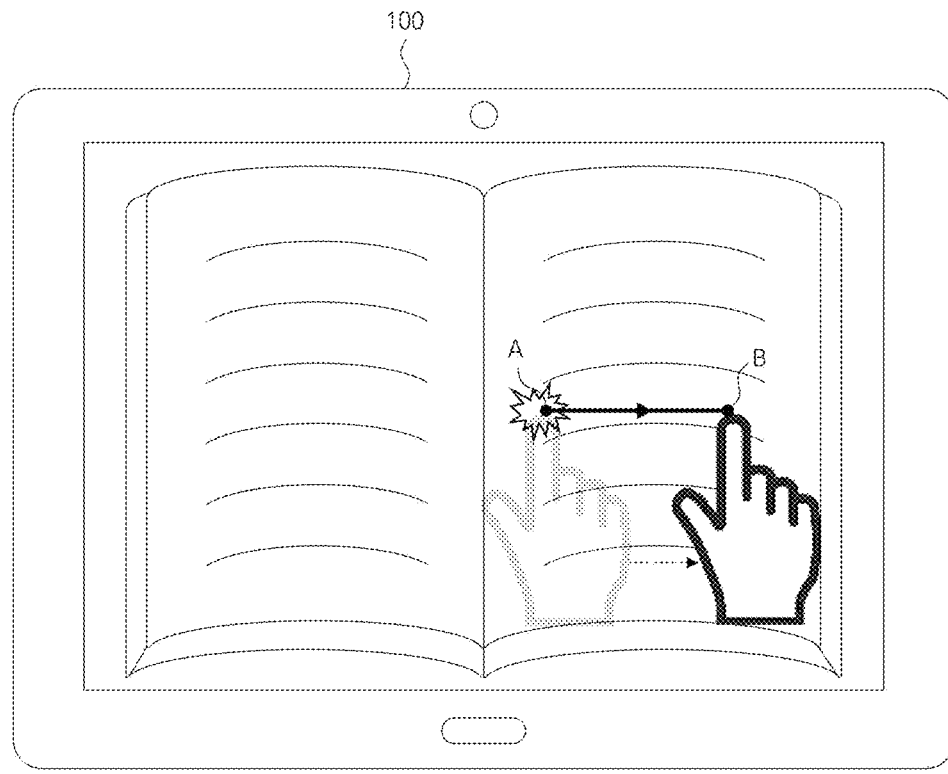
[Fig. 13]
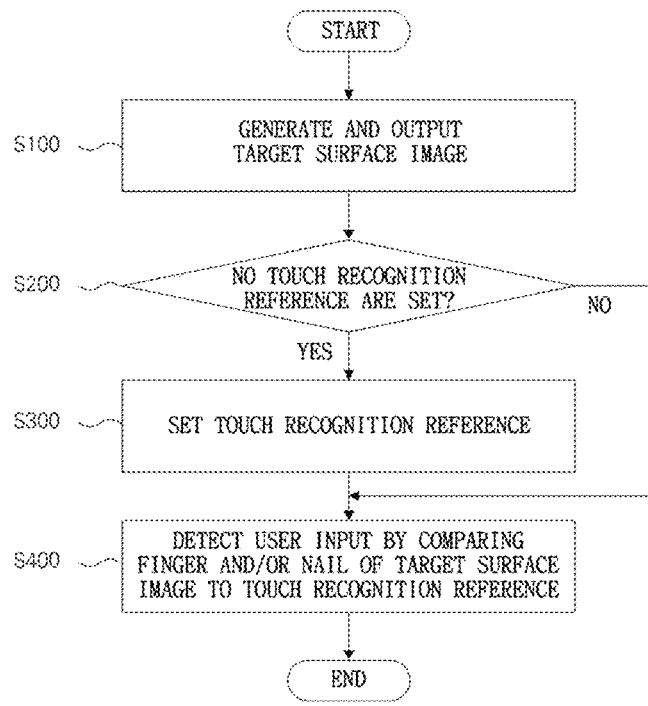

[Fig. 14]
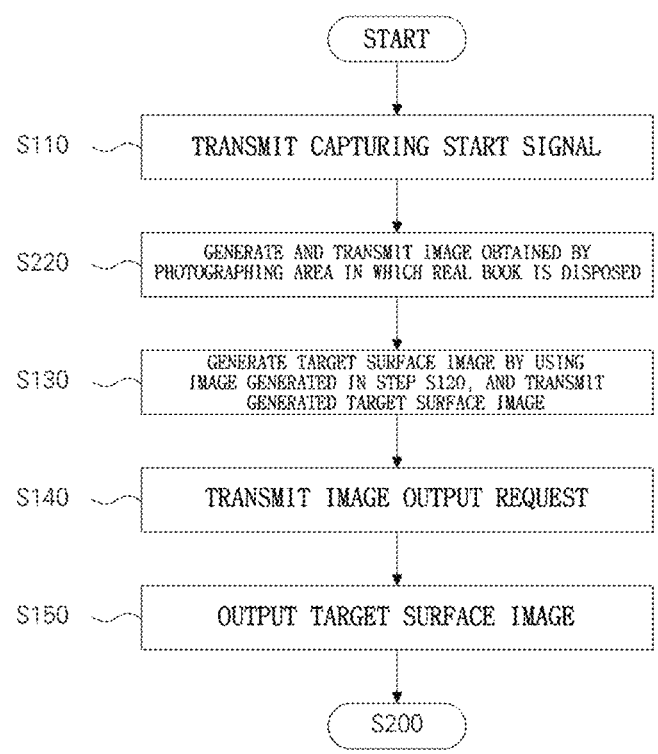

[Fig. 15]
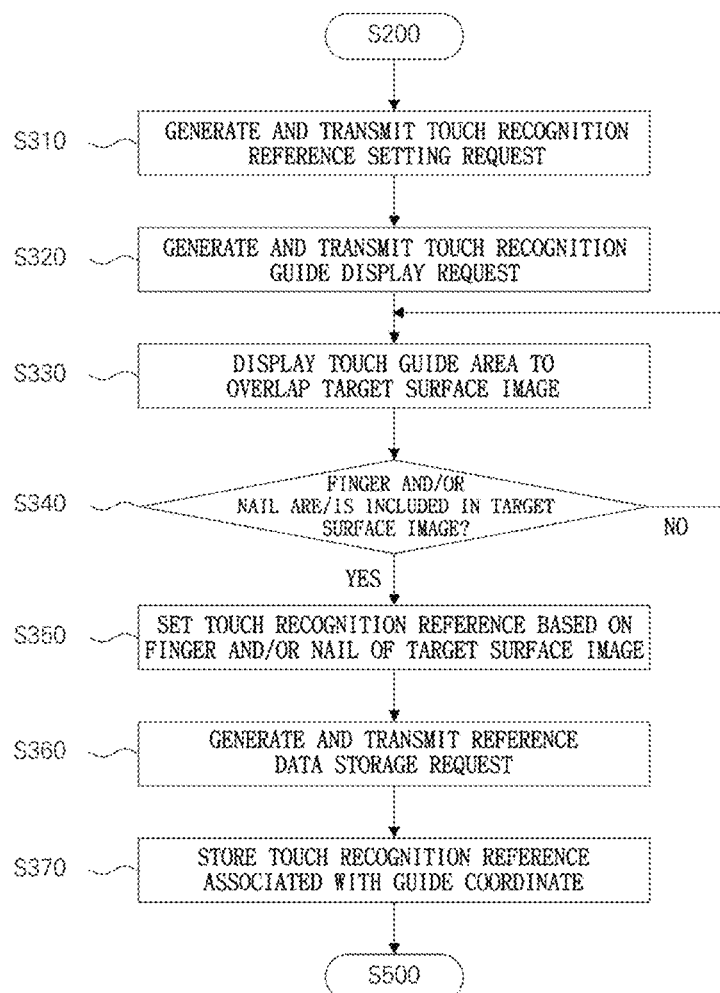

[Fig. 16]
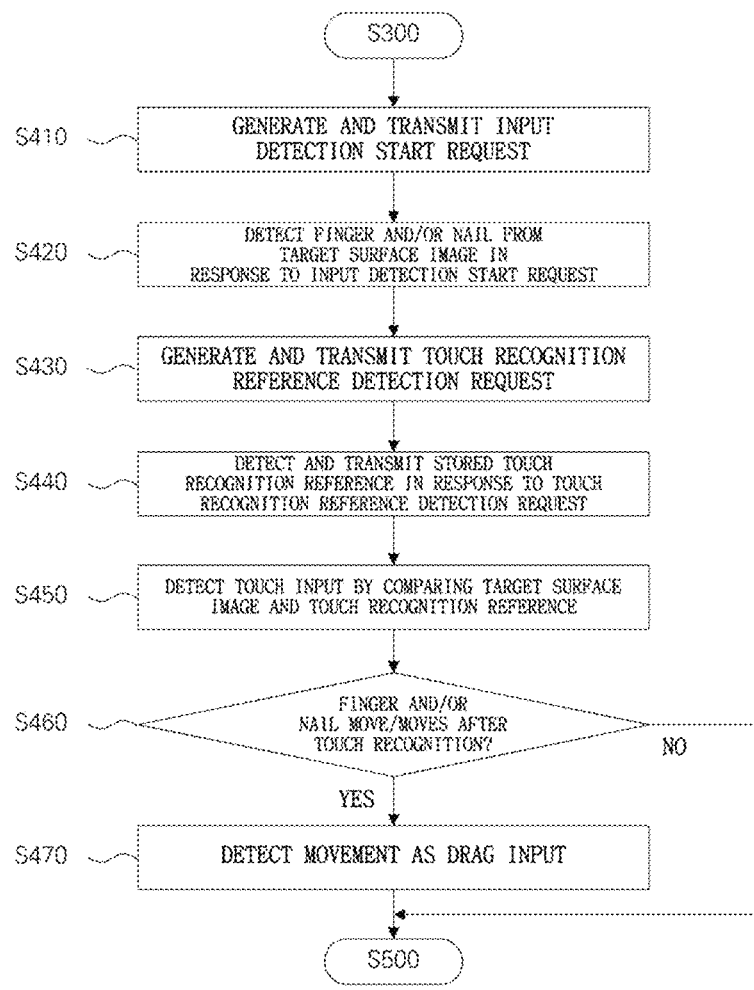

APPARATUS FOR SUPPORTING A READING AND METHOD FOR DETECTING A USER INPUT USING THE SAME

TECHNICAL FIELD

The present disclosure relates to a reading support apparatus for supporting a user's reading by providing additional contents related to a real book.

BACKGROUND ART

In general, reading refers to a behavior of acquiring knowledge by reading a book including letters and images. Recently, people have been accustomed to electronic devices such as a smart phone and tablet. Thus, more and more people acquire knowledge by watching video through the Internet or performing Internet surfing rather than reading a real book composed of only letters and images (i.e. still images).

In the publishing industry, various attempts have been made to replace real books with multimedia books each composed of letters, images, voices, sound effects and videos. However, the conventional multimedia book simply provides voices and images related to the contents of the book, or only provides necessary information in a passive or one-dimensional manner.

Thus, in the publishing industry, research is being conducted on various reading support technologies for inducing a user to actively read a book or to actively participate in reading.

The contents described in the above background art is to promote understanding of the background of the invention, and may contain matters which are not prior arts already known to a person skilled in the art to which the present technology pertains.

RELATED ART DOCUMENT

[Patent Document]
Korean Patent No. 10-1587471

SUMMARY OF INVENTION

Technical Problem

The present disclosure is proposed to solve the above conventional problem, and an object of the present disclosure is to provide a reading support apparatus which can detect a user input (touch and/or drag) conducted on a real book by using one camera, and a user input detection method using the same.

Solution to Problem

To achieve the object, a reading support apparatus according to an exemplary embodiment of the present disclosure includes a memory configured to store instructions which, when executed, cause the reading support apparatus to perform operations; a processor configured to, by executing the instruction stored in the memory, generate and output a capturing start request for starting a service, generate and output an image output request including a target surface image, when the target surface image is inputted as a response to the capturing start request; and a display configured to output the target surface image in response to the image output request, wherein the processor further configured to: generate and output a touch recognition reference setting request for setting touch recognition reference after outputting the image output request, and set the reading support apparatus to an input detection mode and then generate and output an input detection start request, when a reference setting completion message is inputted, process an image, captured through one camera which captures an image of an area having a real book disposed therein in response to the capturing start request, into the target surface image, generate and output a guide display request including a touch guide area in response to the touch recognition reference setting request, set touch recognition reference on the basis of at least one of a finger and nail included in the target surface image after outputting the guide display request, and transmit the reference setting completion message when the touch recognition reference is completely set, and detect at least one of the finger and nail as a detection target from the target surface image in response to the input detection start request, and detect a user's touch input on the basis of the detection target and the touch recognition reference, wherein the display further configured to output a touch guide area to overlap the target surface image in response to the guide display request.

To achieve the object, a user input detection method using a reading support apparatus according to an exemplary embodiment of the present disclosure includes outputting a capturing start request for starting a service; processing an image captured through one camera, which captures an image of an area having a real book disposed therein in response to the capturing start request, into a target surface image, outputting an image output request including the target surface image; outputting the target surface image in response to the image output request; outputting a touch recognition reference setting request for setting touch recognition reference, after outputting the image output request; outputting a guide display request including a touch guide area in response to the touch recognition reference setting request; outputting, by the display, a touch guide area to overlap the target surface image in response to the guide display request; setting touch recognition reference on the basis of at least one of a finger and nail included in the target surface image, after outputting the guide display request; setting the reading support apparatus to an input detection mode when a reference setting completion message is inputted, and then outputting an input detection start request; detecting at least one of the finger and nail as a detection target from the target surface image which is generated after the reference setting completion message is inputted in response to the input detection start request; and detecting a user's touch input on the basis of the detection target detected in the detecting of the at least one of the finger and nail and the touch recognition reference set in the setting of the touch recognition reference.

Advantageous Effects

According to the present disclosure, the reading support apparatus and the input detection method may detect, a user input, touch and drag conducted on a real book, by using a target surface image captured through one camera disposed obliquely above the target surface image, thereby detecting a user input on the surface of the real book which cannot detect a user input such as touch and drag.

Furthermore, the reading support apparatus and the input detection method detect, a user input, touch and drag conducted on a real book, by using a target surface image captured through one camera disposed obliquely above the target surface image, detecting a user input by using one camera embedded in a tablet or camera without adding a camera for detecting a user input. Thus, the reading support apparatus and the input detection method may prevent an additional cost increase, thereby minimizing a product cost and a user's financial burden.

BRIEF DESCRIPTION OF DRAWINGS

FIG. 1 is a diagram for describing a reading support apparatus in accordance with an embodiment of the present disclosure.

FIG. 2 is a diagram for describing a configuration of the reading support apparatus in accordance with the embodiment of the present disclosure.

FIGS. 3 to 8 are diagrams for describing an operation in which the reading support apparatus in accordance with the embodiment of the present disclosure sets touch recognition reference.

FIGS. 9 and 10 are diagrams for describing touch recognition reference stored in a storage module of the reading support apparatus in accordance with the embodiment of the present disclosure.

FIGS. 11 and 12 are diagrams for describing a user input detection process of the reading support apparatus in accordance with the embodiment of the present disclosure.

FIG. 13 is a flowchart for describing a user input detection method using a reading support apparatus in accordance with an embodiment of the present disclosure.

FIG. 14 is a flowchart for describing a target surface image generation and output step in FIG. 13.

FIG. 15 is a flowchart for describing a touch recognition reference setting step in FIG. 13.

FIG. 16 is a flowchart for describing a user input detection step in FIG. 13.

DESCRIPTION OF EMBODIMENTS

Hereinafter, the most preferred exemplary embodiments of the present disclosure will be described with reference to the accompanying drawings in order to specifically describe the exemplary embodiments such that those skilled in the art to which the present disclosure pertains may easily implement the technical spirit of the present disclosure. First, in adding reference numerals to the components of each drawing, it should be noted that the same components have the same reference numerals as much as possible even if they are illustrated in different drawings. Further, in describing the present disclosure, when it is determined that the detailed description of the related well-known configuration or function may obscure the gist of the present disclosure, the detailed description thereof will be omitted.

Those skilled in the art will appreciate that various exemplary blocks, devices or operations, which will be described in relation to components disclosed in this specification, can be implemented in electronic hardware, computer software or a combination thereof. Such blocks, devices or operations may be implemented or performed by using a processor, DSP (Digital Signal Processor), ASIC (Application-Specific Integrated Circuit), ASSP (Application-Specific Standard Product), FPGA (Field-Programmable Gate Array), another programmable logic device, an individual gate or transistor logic device, an individual hardware component or a random combination thereof, which is designed to construct a configuration disclosed in this specification. The processor may be implemented as a combination of computing devices, for example, a combination of a DSP and microprocessor, a plurality of microprocessors, one or more microprocessors connected to a DSP core, or another random component. The computer software or program may be present in a RAM (Random Access Memory), ROM (Read Only Memory), nonvolatile RAM such as flash RAM, EPROM (Erasable Programmable ROM), EEPROM (Electrically Erasable Programmable ROM), register, hard disk, removable disk, CD-ROM or another type of storage medium publicly-known to this technical field, and include machine readable commands which can be executed by an array of logic devices such as processors or DSPs. An exemplary storage medium may be coupled to a processor, and the processor may read information from the storage medium, and write information to the storage medium. As an alternative, the storage medium may be integrated with the processor. The processor and the storage medium may be located in an ASIC. The ASIC may be located in a user terminal. As an alternative, the processor and the storage medium may exist as individual components in a reading support apparatus.

Referring to FIG. 1, a reading support apparatus 100 in accordance with an embodiment of the present disclosure detects, as a user input, a user's touch or drag which is performed on the surface of a real book 10, and provides an action corresponding to the user input.

The reading support apparatus 100 may detect a user input such as touch or drag, when using a plurality of cameras, a depth camera and the like. In this case, however, the increase in cost required for the cameras raises the cost of a product, thereby increasing the financial burden for a user.

When the reading support apparatus 100 is configured to include one camera disposed in parallel to a target surface on one side of the target surface, it is possible to prevent the increase in financial burden. In this case, however, the reading support apparatus 100 may neither detect user inputs other than touch nor capture an image of the target surface. Thus, the reading support apparatus 100 cannot perform an essential function of performing an action corresponding to a user input.

Furthermore, since the reading support apparatus 100 includes one camera 110 disposed obliquely above the target surface in order to capture an image of the target surface and the surface of the real book 10 has no function of detecting a user input such as touch or drag, the reading support apparatus 100 has difficulties in detecting a user input which is performed on the target surface (i.e. the surface of the real book 10).

Therefore, the reading support apparatus 100 in accordance with the embodiment of the present disclosure aims at detecting a user input such as touch or drag by using a target surface image captured through one camera 110 disposed obliquely above the target surface.

For this operation, the reading support apparatus 100 sets touch detection reference data by using an image captured with a finger placed on the target surface, and compares the finger included in an image captured during reading to the touch detection reference data, thereby detecting touch as a user input. When the user's finger moves on the target surface image after the touch is detected among user inputs, the reading support apparatus 100 detects drag as a user input.

Through this operation, the reading support apparatus 100 in accordance with the embodiment of the present disclosure may detect touch or drag as a user input on the target surface with no user input detection function, by using one camera 110 disposed obliquely above the target surface, and perform an action corresponding to the user input.

Referring to FIG. 2, the reading support apparatus 100 in accordance with the embodiment of the present disclosure includes a camera 110, an image processing module 120, a control module 130, a reference setting module 140, a storage module 150, an input detection module 160 and a display 170.

As described in advance, the operations or configuration of the modules 120, 130, 140, 150 and 160 could be understood as operations or configuration of at least one of processor. The processor may perform the operations by executing instructions in a computer program stored in a memory device. However, in the followings, the exemplary embodiments will be described using modules for a convenience of explanation.

Through such a configuration, the reading support apparatus 100 sets touch recognition reference, and compares a target surface image TI captured through one camera 110 to the touch recognition reference, thereby detecting touch among user inputs. The reading support apparatus 100 detects drag when the movement of the finger is continuously detected after the touch was detected. The target surface image TI indicates an image obtained by photographing the surface of the real book 10 or the surface on which the real book 10 is disposed.

Hereafter, in order to easily describe the reading support apparatus 100 in accordance with the embodiment of the present disclosure, the operation of the reading support apparatus 100 will be divided into a touch recognition reference setting operation, a touch recognition operation and a drag recognition operation, and the configuration of the reading support apparatus 100 in each of the operations will be described.

First, the configuration of the reading support apparatus 100 during the touch recognition reference setting operation for touch recognition will be described.

The reading support apparatus 100 sets touch recognition reference for detecting touch among user inputs. The reading support apparatus 100 analyses the target surface image TI captured by one camera 110, and sets touch recognition reference for detecting a user input. The reading support apparatus 100 outputs a touch guide area TGA. The reading support apparatus 100 detects a user's finger in the touch guide area TGA of the target surface image TI. The reading support apparatus 100 sets the size and/or shape of the finger to touch recognition reference.

At this time, the reading support apparatus 100 may set the touch recognition reference by using the user's nail included in the target surface image TI. That is, the reading support apparatus 100 detects the nail of the user's finger. The reading support apparatus 100 sets the size and/or shape of the nail to touch recognition reference.

The control module 130 generates a capturing start request when the reading support apparatus 100 is driven by the user. The control module 130 transmits the capturing start request to the camera 110 and the image processing module 120.

The camera 110 captures an image of the area in which the real book 10 is disposed, in response to the capturing start request of the control module 130. The camera 110 transmits the captured image to the image processing module 120. FIG. 1 illustrates that the image of the area where the real book 10 is disposed is captured through one camera 110 mounted on a holder 20 having the reading support apparatus 100 held thereon. However, the present disclosure is not limited thereto, but an image of the area where the real book 10 is disposed may be captured through one camera 110 embedded in the reading support apparatus 100.

The image processing module 120 generates the target surface image TI in response to the capturing start request of the control module 130. The image processing module 120 processes the image received from the camera 110 into the target surface image TI, and transmits the target surface image TI to the control module 130.

The control module 130 receives the target surface image TI from the image processing module 120, as a response to the capturing start request. The control module 130 generates an image output request including the target surface image TI. The control module 130 transmits the image output request to the display 170.

The display 170 outputs the target surface image TI onto a screen in response to the image output request of the control module 130. At this time, the display 170 outputs the target surface image TI including the real book 10 onto the screen.

The control module 130 generates a touch recognition reference setting request after transmitting the capturing start request. The control module 130 transmits the touch recognition reference setting request to the reference setting module 140.

The reference setting module 140 generates a guide display request in response to the touch recognition reference setting request of the control module 130. The reference setting module 140 sets, to the touch guide area TGA, a part of the area where the image of the surface of the real book 10 is captured in the entire area of the target surface image TI. The reference setting module 140 generates a guide display request including a guide coordinate indicating the coordinate of the touch guide area TGA. The reference setting module 140 transmits the guide display request to the display 170.

Referring to FIG. 3, the display 170 displays the touch guide area TGA on the target surface image TI in response to the guide display request of the reference setting module 140. The display 170 detects the guide coordinate from the guide display request. The display 170 displays the touch guide area TGA to overlap the target surface image TI, based on the guide coordinate. At this time, the display 170 may further display a text or image which induces a user to touch the touch guide area TGA.

When the user touches the real book according to the touch guide area, the reference setting module 140 recognizes the user's finger located on the touch guide area TGA of the target surface image TI, and sets touch recognition reference.

Referring to FIG. 4, when the user's finger touches a part of the real book, corresponding to the touch guide area TGA, in the entire area of the real book 10, the image processing module 120 generates the target surface image TI including the user's finger on the touch guide area TGA, and the display 170 outputs the target surface image TI including the user's finger on the touch guide area TGA.

The reference setting module 140 sets touch recognition reference on the basis of the finger included in the touch guide area TGA. The reference setting module 140 may detect a part of the target surface image TI, corresponding to the touch guide area TGA, and set the touch recognition reference in the form of an image including the user's finger.

For example, referring to FIG. 5, the reference setting module 140 detects a first area corresponding to the touch guide area TGA from the target surface image TI. The reference setting module 140 detects the finger through image analysis on the first area. The reference setting module 140 detects the outline of the finger included in the first area. The reference setting module 140 detects the size (e.g. horizontal length and vertical length) and shape of an area formed by the detected outline of the finger, and sets the detected size and shape to touch recognition reference. At this time, when the entire finger is detected, the accuracy of the touch recognition may be degraded. Thus, the reference setting module 140 may detect a part (e.g. first knuckle) of the finger, and set the detected part to the touch recognition reference.

For another example, the reference setting module 140 may convert the first area detected from the target surface image TI into an image, and set the image to the touch recognition reference. The first area is the touch guide area TGA including the user's finger in the target surface image TI.

The size and shape of the finger may be changed depending on the user's force to press the target surface with the finger. Thus, when the reference setting module 140 sets the finger to the touch recognition reference, the accuracy of the touch recognition may be degraded.

Thus, the reference setting module 140 may set the touch recognition reference on the basis of the user's nail whose shape is hardly changed even though the force to press the target surface with the finger is changed. The reference setting module 140 sets the touch recognition reference on the basis of the nail included in the touch guide area TGA. At this time, the reference setting module 140 may detect a part of the target surface image TI, corresponding to the touch guide area TGA, and set the touch recognition reference in the form of an image including the user's nail.

For example, referring to FIG. 6, the reference setting module 140 detects a first area corresponding to the touch guide area TGA from the target surface image TI. The reference setting module 140 detects the nail through image analysis on the first area. The reference setting module 140 detects the outline of the nail included in the first area. The reference setting module 140 detects the size (e.g. horizontal length and vertical length) and shape of an area formed by the detected outline of the nail, and sets the detected size and shape to touch recognition reference.

For another example, the reference setting module 140 may convert the first area detected from the target surface image TI into an image, and set the image to the touch recognition reference. The first area is the touch guide area TGA including the user's finger in the target surface image TI.

The user may press the target surface with a different force, whenever touching the target surface. Thus, the reference setting module 140 may set an error range for the touch recognition reference.

Since the camera 110 which captures an image of the target surface is disposed obliquely above the target surface, the size and shape of the finger and/or nail may be changed depending on the location of the finger. Thus, the reference setting module 140 may set a plurality of touch recognition reference to raise the accuracy of the touch recognition.

The reference setting module 140 may generate a guide display request including a plurality of touch guide areas TGA in response to the touch recognition reference setting request of the control module 130. The reference setting module 140 sets the plurality of touch guide areas TGA in the area where the image of the surface of the real book 10 is captured in the entire area of the target surface image TI. The reference setting module 140 generates the guide display request including guide coordinates indicating the coordinates of the plurality of touch guide areas TGA. The reference setting module 140 transmits the guide display request to the display 170.

The display 170 displays the plurality of touch guide areas TGA on the target surface image TI in response to the guide display request of the reference setting module 140. The display 170 detects the plurality of guide coordinates from the guide display request. The display 170 displays the plurality of touch guide areas TGA to overlap the target surface image TI on the basis of the plurality of guide coordinates. The display 170 may display the plurality of touch guide areas TGA at the same time.

For example, referring to FIG. 7, the reference setting module 140 may generate a guide display request including a plurality of touch guide areas TGA in response to the touch recognition reference setting request of the control module 130. The reference setting module 140 sets the plurality of touch guide areas TGA in the area where an image of the surface of the real book 10 is captured in the entire area of the target surface image TI. The reference setting module 140 generates the guide display request including guide coordinates indicating the coordinates of the plurality of touch guide areas TGA. The reference setting module 140 transmits the guide display request to the display 170.

The display 170 displays the plurality of touch guide areas TGA on the target surface image TI in response to the guide display request of the reference setting module 140. The display 170 detects the plurality of guide coordinates from the guide display request. The display 170 displays the plurality of touch guide areas TGA to overlap the target surface image TI on the basis of the plurality of guide coordinates.

When the plurality of touch guide areas TGA are displayed at the same time, a user may be confused. Thus, the reference setting module 140 may generate a plurality of guide display requests each including one guide coordinate, and sequentially transmit the plurality of guide display requests to the display 170. Thus, the display 170 sequentially displays the plurality of touch guide areas TGA one by one on the target surface image TI.

FIG. 8 illustrates an example based on the assumption that five touch recognition reference are set.

The reference setting module 140 generates a guide display request including a first guide coordinate of a first guide area, and transmits the guide display request to the display 170. The display 170 detects the first guide coordinate from the guide display request. The display 170 displays a first touch guide area TGA1 to overlap the target surface image TI on the basis of the detected first guide coordinate.

As the user performs an operation of touching a location corresponding to the first touch guide area TGA1, the target surface image TI including the user's finger in the first touch guide area TGA1 is captured. The reference setting module 140 detects the finger and/or nail of the user in the first touch guide area TGA1 of the target surface image TI, and sets the size and/or shape of the finger and/or nail to first touch recognition reference.

The reference setting module 140 sequentially generates a plurality of guide display requests and transmits the plurality of guide display requests to the display 170, the plurality of guide display requests including a second guide coordinate of a second touch guide area TGA2, a third guide coordinate of a third touch guide area TGA3, a fourth guide coordinate of a fourth touch guide area TGA4, and a fifth guide coordinate of a fifth guide area TGA5, respectively.

The display 170 sequentially displays the second to fifth touch guide areas TGA2 to TGA5 to overlap the target surface image TI, based on the second to fifth guide coordinates included in the guide display request.

The reference setting module 140 detects the finger and/or nail of the user in the second to fifth touch guide areas TGA2 to TGA5 of the target surface image TI, and sets the sizes and/or shapes of the finger and/or nail, detected from the respective areas, to second to fifth touch recognition reference.

The reference setting module 140 may perform scaling by using the touch recognition reference, and set touch recognition reference corresponding to areas other than the touch guide areas TGA in the target surface image TI. At this time, the reference setting module 140 performs scaling on the areas other than the touch guide areas TGA by using the touch recognition reference and the location relationship among the touch guide areas TGA.

Furthermore, the reference setting module 140 may set a touch recognition reference range. Depending on the pressing force of the user who touches the target surface, the size and shape of the finger and/or nail may be changed. Thus, the reference setting module 140 sets the touch recognition reference range by applying the error range to the size and/or shape of the finger and/or nail detected from the target surface image TI.

The reference setting module 140 generates a reference storage request including the guide coordinates and the touch recognition reference, which are set through the above-described processes, and transmits the reference storage request to the storage module 150.

The storage module 150 associates the touch recognition reference with the guide coordinates and stores the touch recognition reference associated with the guide coordinates, in response to the reference storage request of the reference setting module 140.

For example, referring to FIG. 9, the storage module 150 associates the touch recognition reference with the guide coordinates, the sizes (for example, horizontal lengths and/or vertical lengths) and shapes, and stores the touch recognition reference associated with the guide coordinates and the sizes and shapes. At this time, the shape may be an image file of a shape formed by the outline of the finger detected from the target surface image TI.

For another example, referring to FIG. 10, the storage module 150 may associate the touch recognition reference with the guide coordinates and finger images, and store the touch recognition reference associated with the guide coordinates and the finger images. At this time, the finger images may be detected from the target surface image TI, and stored as image files.

Since the reference setting module 140 sets the touch recognition reference including only the size and shape of the finger and/or nail, the input detection module 160 which will be described below may detect an unintended touch input of the user. Thus, the reference setting module 140 may set touch recognition reference which further include a setting time, in order to prevent an unintended touch input and to more clearly detect a touch input.

The reference setting module 140 generates a reference setting completion message when the touch recognition reference are completely stored in the storage module 150. The reference setting module 140 transmits the reference setting completion message to the control module 130, in order to end the touch reference setting operation.

Next, the configuration of the reading support apparatus 100 during an operation of recognizing touch among user inputs will be described.

The control module 130 sets the reading support apparatus 100 to an input detection mode in response to the reference setting completion message of the reference setting module 140. As the reading support apparatus 100 is set to the input detection mode, the control module 130 generates an input detection start request, and transmits the input detection start request to the input detection module 160.

The input detection module 160 detects a user input in response to the input detection start request of the control module 130. The input detection module 160 detects touch as a user input by using the target surface image TI generated by the image processing module 120 and the touch recognition reference stored in the storage module 150.

The input detection module 160 detects a finger through image analysis on the target surface image TI. The input detection module 160 detects the coordinate of the detected finger. The input detection module 160 generates a touch recognition reference detection request including the detected coordinate, and transmits the touch recognition reference detection request to the storage module 150.

The storage module 150 detects the stored touch recognition reference in response to the touch recognition reference detection request of the input detection module 160, and transmits the detected touch recognition reference to the input detection module 160.

The storage module 150 detects touch recognition reference associated with a guide coordinate corresponding to the coordinate included in the recognition reference data detection request, among the stored touch recognition reference. At this time, when there is no touch recognition reference corresponding to the coordinate, the storage module 150 detects the touch recognition reference associated with the guide coordinate which is the closest to the coordinate.

The storage module 150 detects touch recognition reference associated with a size and/or shape and a guide coordinate. The storage module 150 may detect touch recognition reference associated with a finger image and a guide coordinate.

The input detection module 160 detects whether the user's touch is inputted, by comparing the finger detected from the target surface image TI to the touch recognition reference in response to the touch recognition reference transmitted from the storage module 150. At this time, when the size of the finger and/or nail detected from the target surface image TI is equal to the size of the finger and/or nail, included in the touch recognition reference, the input detection module 160 determines that a user touch is inputted. When the shape of the finger and/or nail detected from the target surface image TI is equal to the shape of the finger and/or nail included in the touch recognition reference, the input detection module 160 determines that a user touch is inputted.

For example, referring to FIG. 11, when the user's finger is separated from the target surface (i.e. the surface of the real book 10), the finger included in the target surface image TI becomes larger than that of the touch recognition reference TH, and the input detection module 160 determines that no touch is inputted.

On the other hand, when the user's finger touches the target surface, the shape of the finger included in the target surface image TI becomes equal to the shape of the finger of the touch recognition reference TH, and the input detection module 160 detects the touch as a user input.

When the user presses the target surface with a stronger force than when the touch recognition reference are set, the shape of the finger may become smaller than that of the touch recognition reference, while the real book 10 is pressed down. Thus, even when the shape of the finger included in the target surface image TI is smaller than that of the touch recognition reference, the input detection module 160 may detect the touch as a user input.

When the state in which the size of the finger and/or nail detected from the target surface image TI is equal to the size of the finger and/or nail included in the touch recognition reference is maintained for a preset time or more in case that the setting time is included in the touch recognition reference, the input detection module 160 determines that the touch is recognized. When the state in which the shape of the finger and/or nail detected from the target surface image TI is equal to the shape of the finger and/or nail included in the touch recognition reference is maintained for the preset time or more, the input detection module 160 determines that a user touch is inputted.

When the location of the finger and/or nail is moved on the target surface image TI after the touch input is detected, the input detection module 160 detects the movement as a drag input of the user. When the location of the finger and/or nail is changed on the target surface image TI while the touch input is maintained, the input detection module 160 detects the change as a drag input.

Referring to FIG. 12, when the finger and/or nail of the target surface image TI moves to a location B while the touch input is maintained after the touch was detected at a location A of the target surface image TI, the input detection module 160 detects the movement as a drag input to the right.

Furthermore, since one camera 110 is disposed obliquely above the target surface, the size and shape of the finger and/or nail may be changed depending on a touch height. The touch height indicates the distance from the target surface to the surface of the real book 10.

Thus, the reference setting module 140 may detect a target surface height through page recognition on the real book 10, and set touch recognition reference by reflecting the target surface height. That is, the reading support apparatus 100 recognizes a page of the real book 10 from the target surface image TI when setting the touch recognition reference, associates the touch recognition reference with the page, and stores the touch recognition reference associated with the page. In an embodiment, the reading support apparatus 100 scales the touch recognition reference by using the page thickness of the book.

The reading support apparatus 100 may not perform correction into which the height is reflected, when setting the touch recognition reference, but recognize a page of the real book 10 during the touch recognition process, compare the recognized page to the page associated with the touch recognition reference, and correct the touch recognition reference.

The input detection module 160 calculates a page difference by comparing the page of the touch recognition reference to the page recognized during the touch recognition. The input detection module 160 scales the touch recognition reference by reflecting the page thickness of the real book 10 into the calculated page difference, and compares the scaled touch recognition reference to the finger and/or nail of the target surface image TI, thereby detecting a touch input.

Hereafter, a user input detection method in accordance with an embodiment of the present disclosure will be described with reference to the accompanying drawings.

The user input detection method in accordance with the embodiment of the present disclosure is a method for detecting, as a user input, a user's touch or drag which is conducted on the surface of a real book 10, by using one camera 110, in order to provide an action corresponding to the user input.

For this process, the user input detection method includes setting touch detection reference data by using an image captured with a finger placed on a target surface, and comparing the finger included in an image captured during reading to the touch detection reference data, in order to detect touch as a user input. In the user input detection method, when the user's finger is moved on a target surface image TI after touch among user inputs was detected, the movement, i.e. drag, is detected as a user input.

Referring to FIG. 13, the reading support apparatus 100 driven by a user generates a target surface image TI by capturing an image of the area in which a real book 10 is disposed, and outputs the generated target surface image TI, in step S100. In step S100, the reading support apparatus 100 captures an image of the area in which the real book 10 is disposed, by using one camera 110 mounted on a holder 20 having the reading support apparatus 100 held thereon or one camera 110 mounted on the reading support apparatus 100. The reading support apparatus 100 processes the image captured by one camera 110 into the target surface image TI, and outputs the target surface image TI through the display 170.

Referring to FIG. 14, when the reading support apparatus 100 is driven, the control module 130 generates a capturing start request, and transmits the capturing start request to the camera 110 and the image processing module 120, in step S110.

The camera 110 captures an image of the area where the real book 10 is disposed, in response to the capturing start request of the control module 130, and transmits the captured image to the image processing module 120, in step S120. The camera 110 may be one of the camera 110 mounted on the holder 20 having the reading support apparatus 100 held thereon and the camera 110 mounted on the reading support apparatus 100.

The image processing module 120 processes the target surface image TI into the image captured in step S120 in response to the capturing start request of the control module 130, and transmits the target surface image TI to the control module 130, in step S130.

The control module 130 generates an image output request including the target surface image TI received as a response to the capturing start request, and transmits the image output request to the display 170, in step S140.

The display 170 outputs the target surface image TI onto a screen in response to the image output request of the control module 130, in step S150. The display 170 detects the target surface image TI from the image output request, and outputs the target surface image TI including the real book 10 onto the screen.

When no touch recognition reference are set (Yes in step S200), the reading support apparatus 100 sets touch recognition reference in step S300.

Referring to FIG. 15, the control module 130 generates a touch recognition reference setting request after transmitting the capturing start request, and transmits the touch recognition reference setting request to the reference setting module 140, in step S310.

The reference setting module 140 receiving the touch recognition reference setting request from the control module 130 generates a guide display request, and transmits the generated guide display request to the display 170, in step S320. The reference setting module 140 sets, to the touch guide area TGA, a part of the area where the image of the surface of the real book 10 is captured in the entire area of the target surface image TI, and generates a guide display request including a guide coordinate indicating the coordinate of the touch guide area TGA. At this time, when the touch guide area TGA is set in the target surface image TI in advance, the reference setting module 140 generates the guide display request including the coordinate of the touch guide area TGA as the guide coordinate. The reference setting module 140 transmits the guide display request to the display 170.

The display 170 having received the guide display request displays the touch guide area TGA to overlap the target surface image TI in step S330. The display 170 detects the guide coordinate from the guide display request. The display 170 displays the touch guide area TGA to overlap the target surface image TI, on the basis of the guide coordinate. At this time, the display 170 may further display a text or image which induces a user to touch the touch guide area TGA.

When the user's finger touches a location corresponding to the touch guide area TGA in the entire area of the real book 10, the image processing module 120 generates the target surface image TI including the user's finger on the touch guide area TGA, and the display 170 outputs the target surface image TI including the user's finger or nail on the touch guide area TGA. When the finger and/or nail are/is included in the target surface image TI (Yes in step S340), the reference setting module 140 sets touch recognition reference on the basis of the finger and/or nail included in the touch guide area TGA of the target surface image TI, in step S350. The reference setting module 140 detects a part of the target surface image TI, corresponding to the touch guide area TGA, and sets the touch recognition reference in the form of an image including the user's finger and/or nail.

For example, the reference setting module 140 detects a first area corresponding to the touch guide area TGA from the target surface image TI. The reference setting module 140 detects the finger and/or nail through image analysis on the first area. The reference setting module 140 detects the outline of the finger and/or nail included in the first area. The reference setting module 140 detects the size (e.g. horizontal length and vertical length) and shape of an area formed by the detected outline of the finger and/or nail, and sets the detected size and shape to touch recognition reference. At this time, when the entire finger is detected, the accuracy of the touch recognition may be degraded. Thus, the reference setting module 140 may detect the first knuckle of the finger, and set the detected first knuckle to the touch recognition reference.

For another example, the reference setting module 140 may convert the first area detected from the target surface image TI into an image, and set the image to the touch recognition reference. The image includes the finger and/or nail of the user in the first area.

The reading support apparatus 100 may set a plurality of touch recognition reference in order to raise the accuracy of the user input recognition. At this time, the reading support apparatus may set the plurality of touch recognition reference by repeating the process from step S310 to step S350 a plurality of times.

The reading support apparatus 100 may perform scaling by using the touch recognition reference, and set touch recognition reference corresponding to areas other than the touch guide areas TGA in the target surface image TI. At this time, the reference setting module 140 performs scaling on the areas other than the touch guide areas TGA by using the touch recognition reference and the location relationship among the touch guide areas TGA.

Furthermore, the reference setting module 140 may set a touch recognition reference range. Depending on the pressing force of the user who touches the target surface, the size and shape of the finger and/or nail may be changed. Thus, the reference setting module 140 sets the touch recognition reference range by applying an error range to the size and/or shape of the finger and/or nail detected from the target surface image TI.

The reference setting module 140 generates a reference storage request including the guide coordinate and the touch recognition reference, which are set through the above-described processes, and transmits the reference storage request to the storage module 150, in step S360.

The storage module 150 associates the touch recognition reference with the guide coordinate, and stores the touch recognition reference associated with the guide coordinate, in response to the reference storage request of the reference setting module 140, in step S370.

The storage module 150 associates the touch recognition reference with the guide coordinate and the size (for example, horizontal length and/or vertical length) and shape, and stores the touch recognition reference associated with the guide coordinate and the size and shape. At this time, the shape may be an image file of a shape formed by the outline of the finger detected from the target surface image TI. The storage module 150 may associate the touch recognition reference with the guide coordinate and a finger image, and store the touch recognition reference associated with the guide coordinate and the finger image. The storage module 150 may store the touch recognition reference which further includes a setting time.

The reference setting module 140 generates a reference setting completion message when the touch recognition reference are completely stored in the storage module 150. The reference setting module 140 transmits the reference setting completion message to the control module 130, in order to end the touch reference setting operation.

The reading support apparatus 100 detects a user input by comparing the finger and/or nail included in the target surface image TI to the touch recognition reference, in step S400. That is, the reading support apparatus 100 detects the finger and/or nail from the target surface image TI generated in step S100, and compares the detected finger and/or nail to the touch recognition reference set in step S300, thereby detecting touch and drag as a user input.

Referring to FIG. 16, the control module 130 generates an input detection start request in response to the reference setting completion message of the reference setting module 140, and transmits the input detection start request to the input detection module 160, in step S410.

The input detection module 160 detects the finger and/or nail through image analysis on the target surface image TI in response to the input detection start request, in step S420. The input detection module 160 detects the coordinate of the detected finger and/or nail.

The input detection module 160 generates a touch recognition reference detection request including the coordinate detected in step S420, and transmits the touch recognition reference detection request to the storage module 150 in step S430.

The storage module 150 detects the stored touch recognition reference in response to the touch recognition reference detection request of the input detection module 160, and transmits the detected touch recognition reference to the input detection module 160, in step S440. The storage module 150 detects the touch recognition reference associated with the guide coordinate corresponding to the coordinate included in the recognition reference data detection request. At this time, when there is no touch recognition reference corresponding to the coordinate, the storage module 150 detects the touch recognition reference associated with the guide coordinate which is the closest to the coordinate. The storage module 150 detects touch recognition reference associated with the size and/or shape and the guide coordinate. The storage module 150 may detect touch recognition reference associated with a finger image and a guide coordinate.

The input detection module 160 senses whether the user's touch is inputted, by comparing the finger and/or nail detected from the target surface image TI to the touch recognition reference in response to the touch recognition reference transmitted from the storage module 150, in step S450. At this time, when the size of the finger and/or nail detected from the target surface image TI is equal to the size of the finger and/or nail included in the touch recognition reference, the input detection module 160 determines that a user touch is inputted. When the shape of the finger and/or nail detected from the target surface image TI is equal to the shape of the finger and/or nail included in the touch recognition reference, the input detection module 160 determines that a user touch inputted.

For example, when the finger of the user is separated from the target surface (i.e. the surface of the real book 10), the shape of the finger included in the target surface image TI becomes larger than that of the touch recognition reference, and the input detection module 160 determines that no touch is inputted.

On the other hand, when the user's finger touches the target surface, the shape of the finger included in the target surface image TI becomes equal to that of the touch recognition reference, and the input detection module 160 determines that a user input is inputted.

When the user presses the target surface with a stronger force than when the touch recognition reference are set, the shape of the finger may become smaller than that of the touch recognition reference, while the real book 10 is pressed down. Thus, even when the shape of the finger included in the target surface image TI is smaller than that of the touch recognition reference, the input detection module 160 may detect the touch as a user input.

When the setting time is included in the touch recognition reference, the input detection module 160 determines that the touch is recognized, in case that the state in which the size of the finger and/or nail detected from the target surface image TI is equal to the size of the finger and/or nail included in the touch recognition reference is maintained for a preset time or more. When the state in which the shape of the finger and/or nail detected from the target surface image TI is equal to the shape of the finger and/or nail included in the touch recognition reference is maintained for the preset time or more, the input detection module 160 detects this condition as a touch input.

When the location of the finger and/or nail is moved on the target surface image TI (Yes in step s460) after the touch input was detected in step S450, the input detection module 160 detects the movement as a drag input of the user in step S470. When the location of the finger and/or nail on the target surface image TI is changed while the touch input is maintained, the input detection module 160 detects the change as a drag input.

Since one camera 110 is disposed obliquely above the target surface, the size and shape of the finger and/or nail may be changed depending on a touch height. The touch height indicates the distance from the target surface to the surface of the real book 10.

Thus, in step S300, the reference setting module 140 may detect a target surface height through page recognition on the real book 10, and set touch recognition reference by reflecting the target surface height. That is, the reading support apparatus 100 recognizes a page of the real book 10 from the target surface image TI when setting the touch recognition reference, associates the touch recognition reference with the page, and stores the touch recognition reference associated with the page. The reading support apparatus 100 scales the touch recognition reference by using the page thickness of the book.

In step S300, the reference setting module 140 may not perform correction into which the height is reflected, when setting the touch recognition reference. In step S450, the input detection module 160 may recognize a page of the real book 10, compare the recognized page to the page associated with the touch recognition reference, and correct the touch recognition reference. At this time, the input detection module 160 calculates a page difference by comparing the page of the touch recognition reference to the page recognized during the touch recognition. The input detection module 160 scales the touch recognition reference by reflecting the page thickness of the real book 10 into the calculated page difference, and detects a touch input by comparing the scaled touch recognition reference to the finger and/or nail of the target surface image TI.

The reading support apparatus 100 performs an action, such as selection or movement, corresponding to the user input detected in step S400.

Although the preferred exemplary embodiments of the present disclosure have been described above, it is understood that the present disclosure may be modified in various forms, and those skilled in the art may practice various modified examples and changed examples without departing from the scope of the claims of the present disclosure.

The invention claimed is:

1. A reading support apparatus comprising:
 a memory configured to store instructions which, when executed, cause the reading support apparatus to perform operations;
 a processor configured to, by executing the instruction stored in the memory, generate and output a capturing start request for starting a service, generate and output an image output request including a target surface image, when the target surface image is inputted as a response to the capturing start request; and
 a display configured to output the target surface image in response to the image output request,
 wherein the processor further configured to:
  generate and output a touch recognition reference setting request for setting touch recognition reference after outputting the image output request, and set the reading support apparatus to an input detection mode and then generate and output an input detection start request, when a reference setting completion message is inputted,
  process an image, captured through one camera which captures an image of an area having a real book disposed therein in response to the capturing start request, into the target surface image,
  generate and output a guide display request including a touch guide area in response to the touch recognition reference setting request, set the touch recognition reference on the basis of at least one of a finger and nail included in the target surface image after outputting the guide display request, and transmit the reference setting completion message when the touch recognition reference is completely set, and
  detect the at least one of the finger and nail as a detection target from the target surface image in response to the input detection start request, and detect a user's touch input on the basis of the detection target and the touch recognition reference, and wherein the display further configured to output the touch guide area to overlap the target surface image in response to the guide display request.

2. The reading support apparatus of claim 1, wherein the processor generates, as the target surface image, an image inputted from the one camera disposed obliquely above the area in which the real book is disposed.

3. The reading support apparatus of claim 1, wherein the processor sets, to the touch guide area, a part of the area where the image of the real book is captured in the entire area of the target surface image, generates the guide display request including a guide coordinate indicating coordinate of the touch guide area, and outputs the generated guide display request to the display, and wherein the display outputs the touch guide area to a location, corresponding to the guide coordinate included in the guide display request, in the entire area of the target surface image.

4. The reading support apparatus of claim 1, wherein the processor sets the at least one of the finger and nail included in the touch guide area to touch reference data, and sets the touch recognition reference including at least one of a size, shape and image in the target surface image.

5. The reading support apparatus of claim 1, wherein the processor outputs the guide display request including a plurality of touch guide areas having different coordinates in the area where the image of the real book is captured in the entire area of the target surface image, and sets touch recognition reference corresponding to the respective touch guide areas.

6. The reading support apparatus of claim 1, wherein the processor detects the touch recognition reference corresponding to a coordinate within the target surface image of the detection target, and detects a touch input by comparing at least one of the size, shape and image of the detection target to the touch recognition reference.

7. The reading support apparatus of claim 1, wherein the processor scales at least one of a size, shape and image included in the touch recognition reference on the basis of coordinate of the detection target within the target surface image and a guide coordinate of the touch recognition reference, when the detection target is detected in areas other than the touch guide area, and detects a touch input by comparing the scaled touch recognition reference to the detection target.

8. The reading support apparatus of claim 1, wherein the processor, recognizes a page of the real book included in the target surface image on which the touch guide area is displayed, detects a target surface height on the basis of the page, and sets touch recognition reference including the target surface height, and scales the touch recognition reference on the basis of a page difference between a reference page associated with the touch recognition reference and the page of the target surface image, and detects a touch input by comparing the scaled touch recognition reference to the detection target.

9. The reading support apparatus of claim 1, wherein when the state in which the detection target is equal to or smaller than the touch recognition reference is maintained for a preset time or more, the processor detects this condition as a touch input.

10. The reading support apparatus of claim 1, wherein when the movement of the at least one of the finger and nail on the target surface image is detected after the touch input is detected, the processor detects the movement as a drag input.

11. A user input detection method using a reading support apparatus, comprising:

outputting a capturing start request for starting a service;

processing an image captured through one camera, which captures an image of an area having a real book disposed therein in response to the capturing start request, into a target surface image, outputting an image output request including the target surface image;

outputting the target surface image in response to the image output request;

outputting a touch recognition reference setting request for setting touch recognition reference, after outputting the image output request;

outputting a guide display request including a touch guide area in response to the touch recognition reference setting request;

outputting, by the display, the touch guide area to overlap the target surface image in response to the guide display request;

setting the touch recognition reference on the basis of at least one of a finger and nail included in the target surface image, after outputting the guide display request;

setting the reading support apparatus to an input detection mode when a reference setting completion message is inputted and then outputting an input detection start request;

detecting the at least one of the finger and nail as a detection target from the target surface image which is generated after the reference setting completion message is inputted in response to the input detection start request; and detecting a user's touch input on the basis of the detection target detected in the detecting of the at least one of the finger and nail and the touch recognition reference set in the setting of the touch recognition reference.

12. The user input detection method of claim 11, wherein the outputting of the guide display request comprises setting, to the touch guide area, a part of the area where the image of the real book is captured in the entire area of the target surface image, and outputting the guide display request including a guide coordinate indicating the coordinate of the touch guide area, and the outputting of the touch guide area comprises outputting the touch guide area to a location, corresponding to the guide coordinate included in the guide display request, in the entire area of the target surface image.

13. The user input detection method of claim 11, wherein the setting of the touch recognition reference comprises setting the at least one of the finger and nail included in the touch guide area to touch reference data, and setting the touch recognition reference including at least one of a size, shape and image in the target surface image.

14. The user input detection method of claim 11, wherein the outputting of the guide display request comprises outputting a guide display request including a plurality of touch guide areas having different coordinates, and the setting of the touch recognition reference comprises setting touch recognition reference corresponding to the respective touch guide areas.

15. The user input detection method of claim 11, wherein the detecting of the touch input comprises:

detecting a coordinate of the detection target within the target surface image;

detecting the touch recognition reference associated with a guide coordinate corresponding to the coordinate of the detection target; and detecting a touch input by comparing at least one of the size, shape and image of the detection target to the touch recognition reference detected in the detecting of the touch recognition reference.

16. The user input detection method of claim 11, wherein the detecting of the touch input comprises:

scaling at least one of the size, shape and image included in the touch recognition reference on the basis of coordinate of the detection target within the target surface image and a guide coordinate of the touch recognition reference, when the detection target detected in the detecting of at least one of the finger and nail is detected in areas other than the touch guide area in the entire area of the target surface image; and detecting a touch input by comparing the touch recognition reference, scaled in the scaling of the at least one of the size, shape and image, to the detection target.

17. The user input detection method of claim 11, wherein the setting of the touch recognition reference comprises:

recognizing a page of the real book included in the target surface image on which the touch guide area is displayed;

detecting a target surface height on the basis of the page recognized in the recognizing of the page; and setting touch recognition reference including the target surface height detected in the detecting of the target surface height.

18. The user input detection method of claim 17, wherein the detecting of the touch input comprises:

calculating a page difference between a reference page associated with the touch recognition reference and the page of the target surface image;

scaling the touch recognition reference on the basis of the page difference; and detecting a touch input by comparing the scaled touch recognition reference to the detection target.

19. The user input detection method of claim 11, wherein the detecting of the touch input comprises, when the state in which the detection target is equal to or smaller than the touch recognition data is maintained for a preset time or more, detecting this condition as a touch input.

20. The user input detection method of claim 11, wherein the detecting of the touch input further comprises, when the movement of the at least one of the finger and nail on the target surface image is detected immediately after the touch input is detected, detecting the movement as a drag input.

\* \* \* \* \*